United States Patent

Peck

[15] 3,638,793
[45] Feb. 1, 1972

[54] SEWAGE TREATMENT SYSTEM

[72] Inventor: Lawrence J. Peck, 4 Barney Road, Elnora, N.Y. 12065

[22] Filed: Sept. 22, 1969

[21] Appl. No.: 859,676

[52] U.S. Cl..............................210/73, 210/108, 210/195, 210/196
[51] Int. Cl.......................................................B01d 37/04
[58] Field of Search ..........................210/73, 108, 194–197, 210/237–239

[56] References Cited

UNITED STATES PATENTS

| | | | |
|---|---|---|---|
| 1,999,058 | 4/1935 | Raisch | 210/73 X |
| 2,359,004 | 9/1944 | Schlenz et al. | 210/195 X |
| 2,391,494 | 12/1945 | Walker | 210/195 X |
| 2,754,250 | 7/1956 | Shipman, Jr. | 210/195 X |
| 3,111,486 | 11/1963 | Soriente | 210/108 |
| 3,168,467 | 2/1965 | Drever | 210/108 |
| 3,502,212 | 3/1970 | Ueda | 270/108 X |
| 2,580,764 | 1/1952 | Gunz | 210/195 X |

*Primary Examiner*—John Adee
*Attorney*—Robert E. Heslin

[57] ABSTRACT

The effluent from a conventional primary or secondary sewage treatment plant is passed through a self-cleaning mechanical strainer and then into a high-rate, granular, pressure filter. A portion of the filtered effluent is recirculated through the strainer and filter in order to maintain a uniform flow rate on the filter. Suspended solids collected by the strainer and the high-rate filter are returned to the entrance of the primary treatment area for retreatment.

10 Claims, 1 Drawing Figure

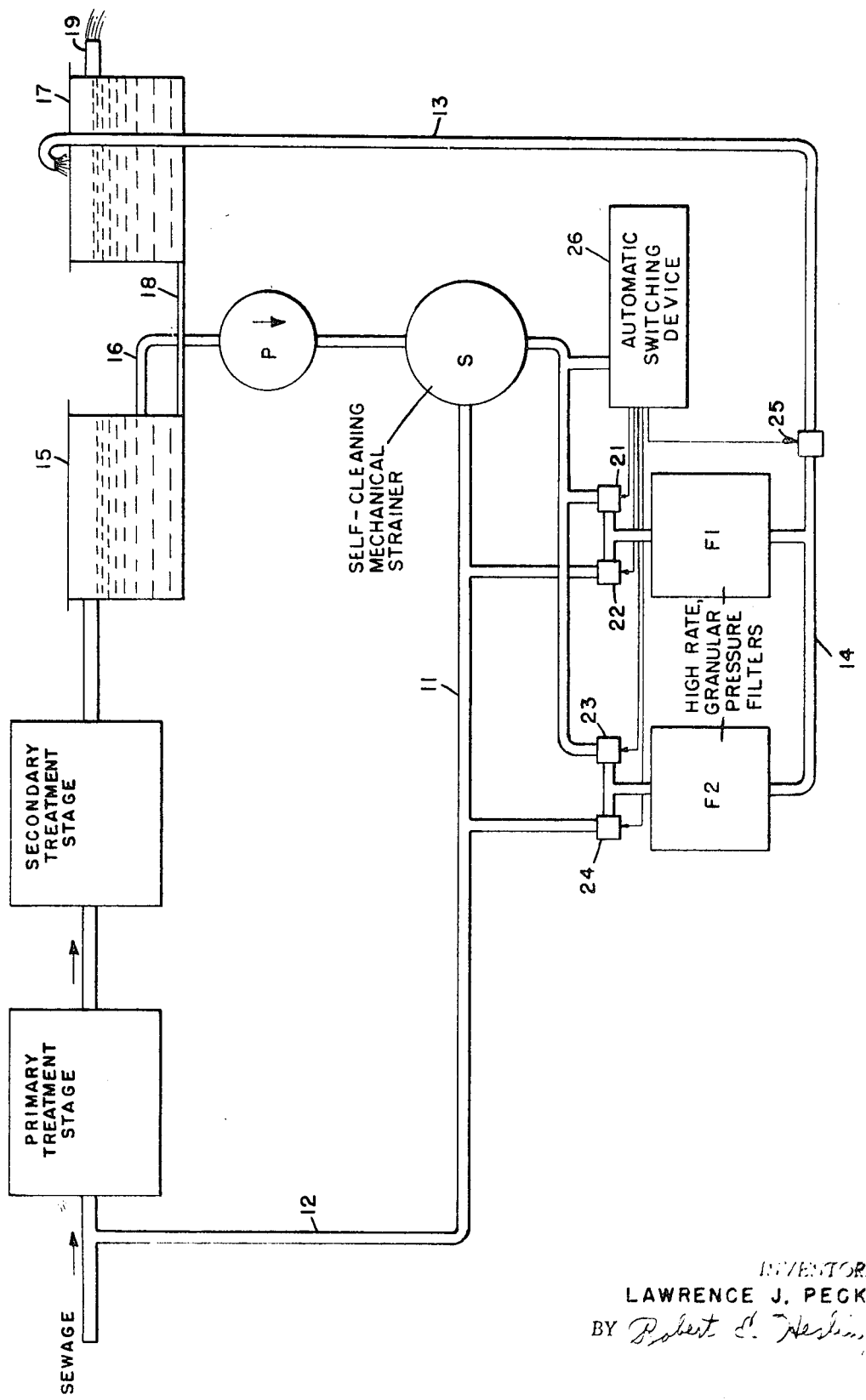

SEWAGE TREATMENT SYSTEM

BACKGROUND OF THE INVENTION

This invention relates to sewage treatment system and more particularly relates to an apparatus for tertiary sewage treatment.

Sewage treatment systems may have three stages of treatment. The first stage is commonly called "Primary Treatment" and, by definition, generally consists of the settling out of suspended solids with maximum removals of 33 percent.

The next stage found in most conventional sewage treatment facilities provides what is generally called "Secondary Treatment." In this stage the object is to achieve minimum removals of 75 percent and involves some biological activity.

The final stage in a conventional sewage treatment system is generally called "Tertiary Treatment," though it is not necessarily a third stage. This stage usually consists in passing the effluent from the second stage over beds of sand. As the sewage passes over the beds, waste particles are filtered out producing an effluent with removals exceeding 95 percent.

This method of tertiary treatment is subject to several disadvantages. In the first place, relatively large parcels of land are required to provide sand beds of sufficient size to achieve the desired level of sewage treatment. In fact, flow rates in such systems are measured in gallons per acre per day. Secondly, the sand beds have to be periodically cleaned because they become clogged with waste matter. The cleaning process involves skimming off the top inch or so of sand by hand and replacing it with fresh sand. Finally, unpleasant odors are normally generated by this form of tertiary treatment. It is believed that all of these disadvantages are substantially overcome by the present invention.

SUMMARY OF THE INVENTION

It is an object of this invention to provide a sewage treatment system which will provide tertiary treatment and which will not require the use of a substantial parcel of land.

It is a further object of this invention to provide a sewage treatment system, including tertiary treatment, which will be relatively odorless.

It is a further object of this invention to provide a sewage treatment system which will not require periodic changing of the filtering media of the tertiary stage.

It is a further object of this invention to provide a sewage treatment system which will result in substantial savings in the cost of installation, operation and maintenance.

It is a further object of this invention to provide a sewage treatment system which will be automatic in operation.

The objects of this invention are accomplished by passing the sewage to be treated through a strainer and a pressure filter. The strainer removes relatively large particles from the sewage, thereby reducing the load on the pressure filter. Means are provided for maintaining a suitable continuous rate of flow through the filter regardless of the rate at which sewage is entering the plant.

BRIEF DESCRIPTION OF THE DRAWING

The drawing is a schematic diagram, partly in block form, showing the elements of the system.

As can be seen, the first and the second stages of the sewage treatment system are designated as "Primary Treatment Stage" and "Secondary Treatment Stage." What follows comprises the tertiary treatment stage.

The effluent from the secondary treatment stage first passes into holding tank 15. From there it passes through pipe 16 to pump P. This pump is provided for the purpose of maintaining a suitable flow rate in the tertiary stage of the system. The discharge from the pump is passed into a mechanical strainer S which is preferably of the self-cleaning type. Although any suitable device would suffice, it has been found that the Model "A" self-cleaning strainer manufactured by S. P. Kinney Engineers, Inc. works very well for purposes of the system disclosed herein. This device will remove relatively large particles from the fluids being treated. Generally, and without intending to define a precise classification, large particles are those having diameters exceeding 0.01 inches. Particles removed by the strainer S are returned to the primary treatment stage by means of pipes 11 and 12 for further treatment.

After passing through the Strainer S, the sewage is then passed through a pressure filter, preferably of the granular type, where relatively small particles are removed. In the drawing, two such filters are shown, F1 and F2. These filters are operated alternately as will be explained hereinafter. After the sewage has passed through filter F1 or F2, as the case may be, it is passed to a discharge tank 17. At this point, chlorine may be introduced as required and the effluent will be held for a time sufficient to permit adequate sterilization.

The discharge tank is shown as being on a level with holding tank 15. Also, these two tanks, as shown, are connected by a return pipe 18. Overflow pipe 19 on discharge tank 17 provides the outlet for finally treated effluent. The primary purpose of this arrangement of these tanks is to provide for a suitable continuous rate of flow of sewage through filter F1 or F2, as the case may be. It will be understood that a portion of the treated sewage discharged into tank 17 will return via pipe 18 for recirculation through the tertiary stage of the system. The size of the portion so returned will depend upon the rate of flow of sewage entering tank 15 from the secondary stage, but the rate of flow through pipe 16, and thus filter F1 or F2, will be relatively uniform. The rate at which finally treated effluent will be discharged through overflow pipe 19 also will depend upon the rate of flow of sewage entering tank 15 from the secondary stage.

Naturally, other means could be employed for maintaining a uniform flow rate on the filter. For example, one might simply provide a holding tank to collect a predetermined amount of sewage to be released at a particular flow rate. But the system shown seems preferable because of its treatment and retreatment mode of operation. In any event, some means of flow rate maintenance should be employed to insure effective and trouble-free operation of the filters F1 and F2.

In operation, the sewage passes from the primary or secondary treatment stage through the pump and into the strainer S. If strainer S is of the self-cleaning type, there is no need to shut this strainer down periodically for cleaning. The discharge from the strainer S during normal operation passes through valve 21 and filter F1 and valve 25 to the discharge tank 17. Valves 22, 23 and 24 are closed at this time. After filter F1 has been in operation for a period of time, it will become loaded with suspended solids and must be cleaned. The cleaning process is accomplished by means of suitable switching of valves 21, 22, 23, 24 and 25, as described below.

When the loading in filter F1 increases the back pressure to a predetermined level, a pressure-sensitive automatic switching device 26 is triggered to initiate the cleaning cycle. Valves 21 and 25 which are normally open are now closed. Valves 23 and 22 are now open. The result is that the effluent from strainer S passes through F2 in the forward direction and through filter F1 in a reverse direction. The effect of passing fluid through a filter of this type in a reverse direction is to dislodge the collected particles, thereby removing them. This is known as "backwashing." After passing through filter F1 the fluid and dislodged solids are passed by means of pipes 11 and 12 to the primary treatment stage for retreatment.

The backwashing of filter F1, as above described, proceeds only for a matter of minutes. Then valve 22 closes and valve 25 opens. The result is that F2 is now in operation and normal sewage treatment proceeds. Filter F2 may be left in operation for a predetermined length of time after which a similar cycle will be initiated. In this cycle filter F1 will first be used to backwash F2. Then filter F1 would continue in operation for normal sewage treatment. It should be mentioned that the pressure-sensitive device, mentioned above, as well as the apparatus for cycling the backwashing operation may be any of several suitable automatic devices available in the market place.

It will be appreciated that the system for cleaning filters F1 and F2 makes the system automatic. The cleaning operations proceed when required, as determined by the pressure sensitive apparatus mentioned above. The arrangement shown is, of course, only one way of accomplishing this objective and those skilled in the art will realize that many other methods could be employed for the same purpose.

What has been described is the preferred form of the invention. With the combination of devices above described it is preferable to use a flow rate in the pressure filter in excess of 12 gallons per square foot per minute. This high rate permits the use of relatively small filters with good results. As mentioned earlier, sand beds with their problems of maintenance, land consumption and unpleasant odors are eliminated. Of course, various modifications of the invention disclosed herein may be made without departing from its spirit. It is intended to include all such variations within the scope of the appended claims.

What is claimed is:

1. An improved sewage treatment system of the type having at least a primary treatment stage wherein the improvement comprises:

strainer means having an inlet and an outlet for receiving sewage which has been processed through at least the primary stage and removing relatively large particles from the sewage;

a filter connected to the outlet of the strainer means for receiving the sewage and removing relatively small particles therefrom; and storage means connected to the filter for receiving sewage discharged therefrom including means for retaining and recirculating at least a portion of such sewage through at least the filter so as to maintain a substantially continuous rate of flow through the filter.

2. The invention of claim 1 wherein the filter is a pressure filter.

3. The invention of claim 2 wherein the storage means is comprised of:

a holding tank having an inlet connected to the primary stage and having an outlet;

a pump having an inlet and an outlet and having its inlet connected to the outlet of the holding tank and having its outlet connected to the inlet of the strainer means;

a discharge tank located substantially on the same level with the holding tank and having an inlet for receiving the effluent from the filter and having an outlet above the level of the outlet of the holding tank for the final discharge of treated sewage, said discharge tank being connected with the holding tank at a level below that of the outlet of the holding tank whereby an amount of the effluent of the filter will be recirculated such amount being decreased as the amount of sewage entering the holding tank from the primary treatment stage is increased.

4. The invention of claim 2 wherein the strainer means is a self-cleaning mechanical strainer.

5. The invention of claim 4 wherein the pressure filter is of the granular, high-rate type.

6. The invention of claim 5 in combination with backwashing means for cleaning the filter.

7. The invention of claim 6 wherein the means for backwashing the pressure filter are comprised of:

a second filter;

valve means connected to the first filter and the second filter; and pressure-sensitive switching means for operating the valve means when the back pressure of the first filter reaches a predetermined value.

8. An improved method of sewage treatment of the type wherein the sewage is given at least primary treatment wherein the improvement comprises the steps of:

straining the sewage, after it has received at least primary treatment, to remove relatively large particles;

filtering the sewage through a high rate pressure filter to remove relatively small particles;

retaining at least a portion of the filtered sewage, and recirculating the retained sewage through the filter, so as to maintain a substantially continuous rate of flow therein.

9. The method of claim 8 wherein the step of straining is effective generally to remove particles from the sewage having diameters exceeding 0.01 inches and wherein the step of filtering is effective generally to remove particles from the sewage having diameters of less than 0.01 inches.

10. The invention of claim 9 wherein the continuous rate of flow maintained is at least 12 gallons per square foot per minute.

* * * * *